2,850,211
FLUID DISPENSING APPARATUS

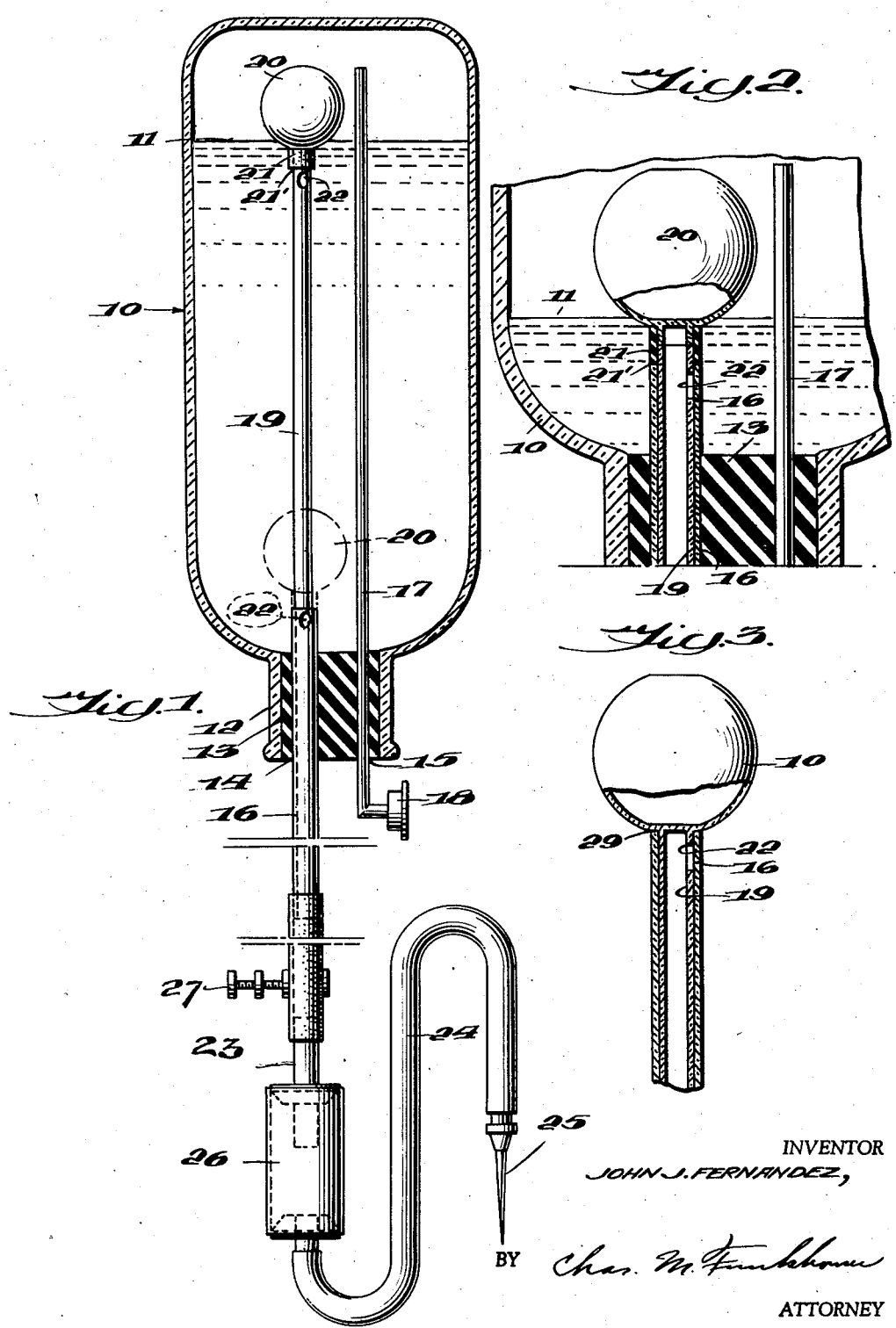

John J. Fernandez, Baltimore, Md., assignor of one-half to Yale Goldman, Baltimore, Md.

Application December 23, 1955, Serial No. 555,111

6 Claims. (Cl. 222—67)

This invention relates to fluid dispensing apparatus and more particularly to a novel form of apparatus for dispensing aseptic medicinal fluids.

The practice of injecting medicinal fluids intravenously into human body tissue is well known in the medical art and in accordance with the well known practice, the aseptic fluid is usually withdrawn from bulk in an associated reservoir-container by flexible tubes connecting the container with appropriate needles penetrating the patient's body tissues for the purpose of injecting the fluid as desired. The flow of fluid from the container is usually by gravity and is regulated by a clamp valve on the flexible outlet tube so as to control the dispensing of the fluid. Also positioned in the discharge line and located near the container-reservoir is a drip meter or flow indicating device usually made of transparent material such as glass, plastic or the like so that the drops of fluid passing from the container to the tubes may be observed. It is well known that a change in hydrostatic head pressure of the fluid in the container changes the rate of delivery of the fluid from the bottom outlet of the container. The fluid discharge is usually in the form of drops and the change in hydrostatic head causes these drops to become irregular, slow up, or stop altogether, with the attendant annoyance to the doctor or nurse administering the fluid. These changes in fluid delivery sometimes affect the patient's health when the quantity or regularity of such injected fluid is of critical nature.

An important object of the present invention is to provide a novel form of aseptic dispensing apparatus which shall be more reliable and dependable in operation than similar devices now in use.

Another object of the invention is to provide a novel form of dispensing device which shall maintain a constant flow of fluid from a supply container.

Another object of the invention is to provide a novel dispensing apparatus which shall operate to control fluid flow independently of the change in hydrostatic head pressure of fluid in the reservoir-container.

Another object of the invention is to provide a novel valve for sealing the delivery tube against the ingress of air when the container is empty.

A further object of the invention is to provide a novel float feed control for the dispensing apparatus which shall insure uniform fluid flow independently of the height of fluid in the container.

These and other objects of the invention will be more apparent from the following specification and drawings and more particularly set forth in the claims.

In the drawings:

Figure 1 is a vertical sectional view, partly in elevation, showing the complete apparatus in operative association with the normal lower portion of a suitable reservoir-container;

Figure 2 is an enlarged sectional view in elevation showing the discharge tube sealing device; and Figure 3 is a modification of the float and valve shown in Figure 2.

Referring to the drawings, there is shown in Figure 1 an inverted reservoir-container 10 containing an aseptic fluid indicated by the fluid level 11. The lower portion of the container includes a neck portion 12 which is closed by an appropriate plug 13 of yieldable material such as rubber and the like. The yieldable plug is provided with axial channels 14—15, one of which receives a fluid distributing connection tube 16 and the other to receive a conventional vent tube 17 for venting the top portion of the container to prevent the formation of a vacuum or air lock which retards or prevents the constant flow when fluid is withdrawn from the container. Located at the outer exterior end of the tube 17 is a filter element 18 of well known construction to prevent any contamination of atmospheric air entering the container 10.

Fluid is withdrawn by means of the tube 16 supported by the plug 13 and extending partly into the container. The tube 16 may be of glass or plastic material and is adapted to receive another similar tube 19 mounted in telescopic relation thereto. This tube 19 freely sliding in tube 16, carries at its upper extremity a float member 20 which descends with the lowering of the fluid level in the container. Adjacent to the float is a valve member 21 in the form of an annular rubber band. This band also serves as a flexible connection between the float and tube 19. At the upper end of the tube 19 and just below the lower edge of the valve band 21 is an opening 22 in the side of the tube 19 and through which fluid passes to the tube 19 and thence to the telescopic tube 16 to point of delivery or application.

The important feature of this proposed construction is that the float 20 rides on the surface of the fluid in the container and the opening 22 is normally just submerged below the surface as shown in Figure 1. This arrangement provides that the flow of fluid shall always be constant and independent of any change in hydrostatic head of the fluid in the container as the fluid is used and the resulting lowered fluid surface.

When the fluid supply is depleted, the float will be at the bottom of the container as shown in dotted lines in Figure 1 and in Figure 2. In this position the valve seat 21' engages the end of tube 16 and seals off the opening thereof so as to prevent the entrance of any air into the discharge tube 16 as well as maintain fluid in the system including the associated delivery tubes 23 and 24 leading to an injection needle 25 insertable in the body tissue.

In order to better observe the performance of the apparatus there is provided in the discharge tube line 23, a drip meter of transparent material and indicated by the numeral 26 wherein the amount of fluid in the form of drops may be observed. The flow of fluid is also regulated by a clamp valve 27 located between the container 10 and the drip meter 26, the usual construction for such devices.

The valve member 21 shown in Figure 1 is in the form of a rubber band to form a valve element seating with the top edge of tube 16 but this arrangement may be modified as shown in Figure 3 wherein the ball float 10 may be united directly to the end of tube 19 and the surface of the ball adjacent the end of the tube being ground to form a sealing fit as indicated by the numeral 29. Whichever form of float valve is employed for controlling the fluid flow delivery, the entrance opening 22 for receiving fluid will always be near the fluid surface irrespective of hydrostatic head. The particular arrangement of the valve seating parts prevents complete depletion of the fluid in the injection system supply tube 24 thus obviating the necessity for keeping a constant watch on the operation of the apparatus. This is an important feature of the invention in that it positively prevents the ingress of air into the tube 24 at any time when the container 10 is empty or when a fluid container is renewed for continued injection.

While I have shown and described two preferred embodiments of my invention it is obvious that various changes may be made therein without departing from the scope of the invention as defined in the claims.

What I claim is:

1. In a fluid dispensing apparatus, the combination of a container, a tubular delivery member extending into the container through a wall thereof, a second tubular member located in the container and telescopically fitting the entrance of the delivery member, said second tubular member having a fluid entrance opening at the upper portion thereof, and a float member connected to the second tubular member and movable therewith for regulating the movement of said second tubular member to control the flow of fluid from the container.

2. In a fluid dispensing apparatus, the combination of a container, a tubular delivery member mounted therein, means for venting the interior of said container, a second tubular member telescopically fitting into the inner end of said first tubular member and guided thereby for receiving fluid from the interior of said container and a float member carried by the second tube to regulate the movement thereof and control the delivery of fluid from the container.

3. Apparatus of the character designated in claim 2 including an opening provided near the top of said movable tubular member, a cooperating valve member located adjacent the entrance to said movable tubular member for shutting off communication between the container and the delivery tubular member when the container is emptied of fluid.

4. A float valve for a fluid dispensing apparatus including a fixed dispensing tube, a fluid supply tube telescopically fitting the dispensing tube and movable relative thereto, an opening provided at the top portion of said supply tube, a float member connected to the end of said telescopic tube and valve means carried by said float member to engage and seal the entrance end of said dispensing tube.

5. A fluid dispensing apparatus of the character described including a fluid container, a conduit extending into the bottom of the container for dispensing fluid, a float, and a valved conduit member communicating with the dispensing conduit and connected to and movable with the float member for receiving top level fluid throughout the vertical movement of the float and conducting it to the dispensing conduit, whereby the flow of fluid from the container is constant and independent of hydrostatic head pressure.

6. Apparatus of the character described in claim 5 in which the conduit members are telescopically arranged and the movable telescopic member including a valve opening formed therein adjacent to the float.

References Cited in the file of this patent

UNITED STATES PATENTS

| | | |
|---|---|---|
| 1,711,782 | Hamaker | May 7, 1929 |
| 2,141,638 | Bean | Dec. 27, 1938 |
| 2,506,240 | Sekkel | May 2, 1950 |